United States Patent [19]
Breysse et al.

[11] 3,831,763
[45] Aug. 27, 1974

[54] SEPARATION APPARATUS

[75] Inventors: Jacques Breysse, Villeurbanne; Jean Roget, Lyon, both of France

[73] Assignee: Rhone-Poulenc S.A., Paris, France

[22] Filed: Feb. 24, 1972

[21] Appl. No.: 228,887

[30] Foreign Application Priority Data
  Feb. 25, 1971  France .............................. 71.06493
  June 1, 1971   France .............................. 71.19774

[52] U.S. Cl.................. 210/321, 210/346, 210/433
[51] Int. Cl............................................ B01d 31/00
[58] Field of Search ............ 210/23, 321, 433, 346, 210/486

[56]            References Cited
           UNITED STATES PATENTS
3,219,573  11/1965  Cheh et al. ..................... 210/321 X
3,397,141  8/1968  Hakai............................. 210/321 X
3,397,785  8/1968  Jarvis et al...................... 210/486 X
3,398,091  8/1968  Greatorex....................... 210/321 X
3,398,833  8/1968  Marks et al...................... 210/321
3,520,803  7/1970  Iaconelli ........................ 210/321 X

*Primary Examiner*—Frank A. Spear, Jr.
*Attorney, Agent, or Firm*—Stevens, Davis, Miller and Mosher

[57]            ABSTRACT

Separation apparatus useful particularly for ultrafiltration in which a series of membranes are mounted in superposed relationship with membrane supports, and, where appropriate, distribution plates therebetween, the membranes being mounted in sub-assemblies so that the flow of fluid through the individual chambers between the membranes of a particular sub-assembly is substantially in parallel.

10 Claims, 20 Drawing Figures

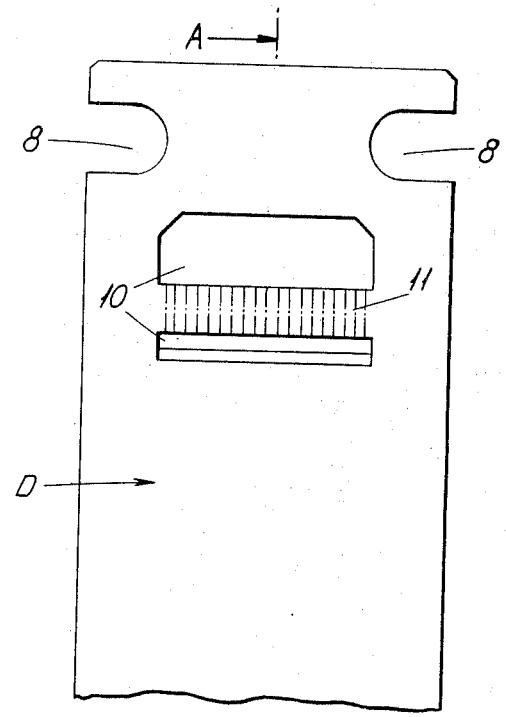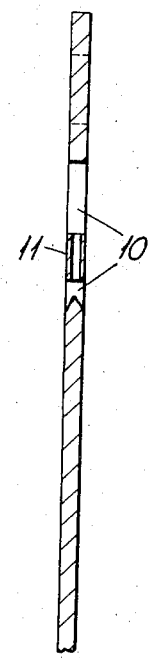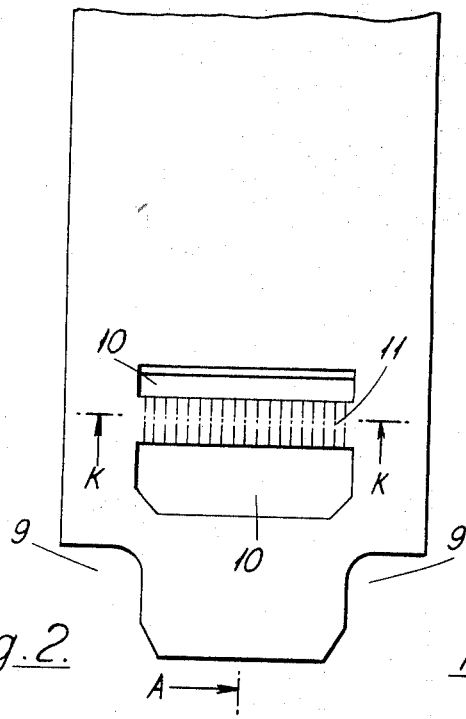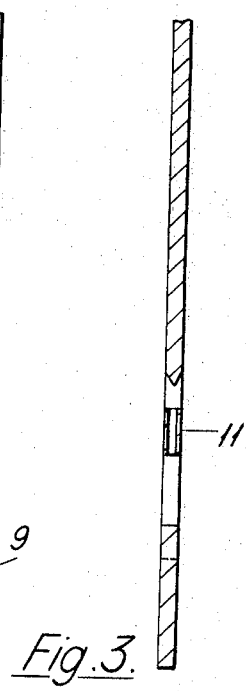
Fig.2.  Fig.3.

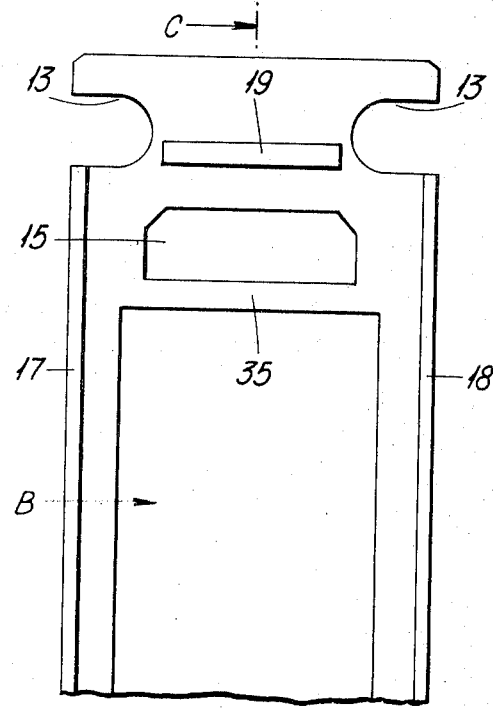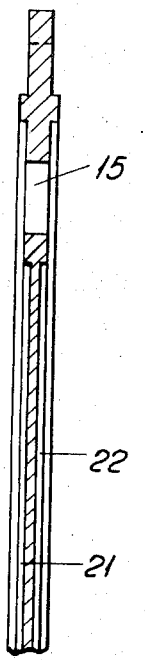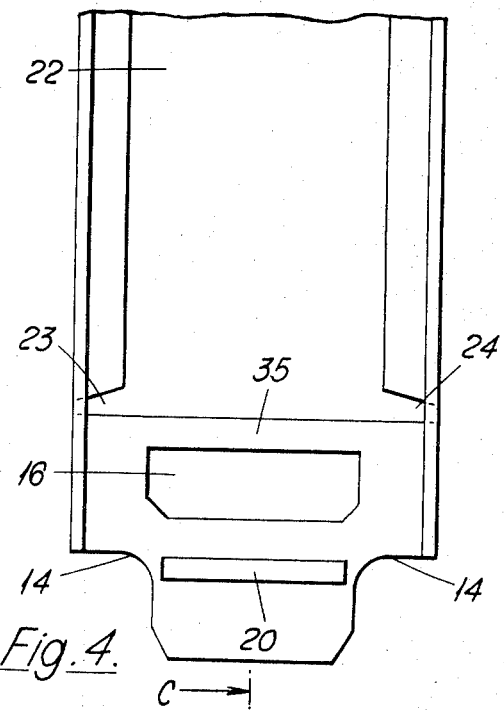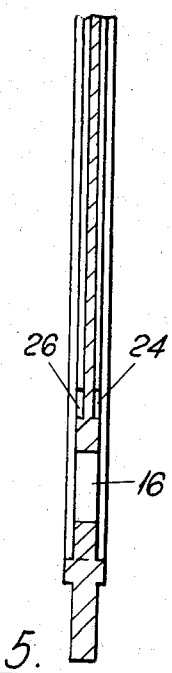
Fig.4.     Fig.5.

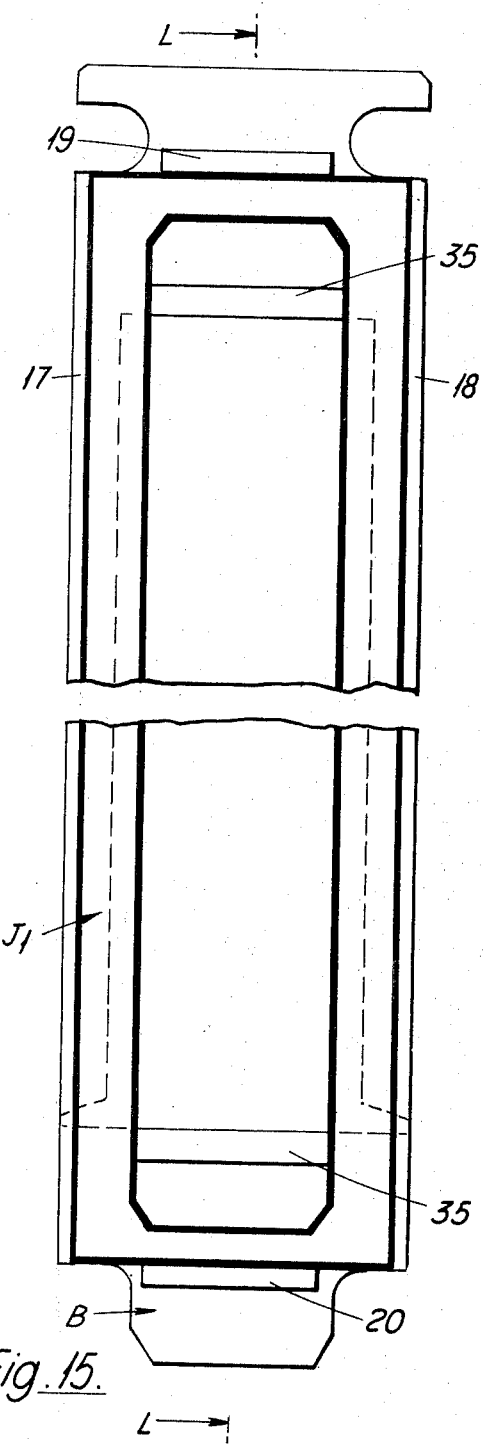
Fig. 15.
Fig. 16.

SEPARATION APPARATUS

The present invention relates to a separation apparatus employing semi-permeable membranes, which can be used for filtration, hyperfiltration, inverse osmosis, gas permeation and especially ultrafiltration operations, for the purpose of carrying out different types of operations such as concentration or purification.

Ultrafiltration apparatuses employing plane membranes are known, for example from U.S. Pat. No. 3,398,091, in which the liquid follows a tortuous path as it passes from chamber to chamber. A high degree of filtration can be achieved, but if it is necessary to have a high flow rate there is always a consequent high pressure drop.

According to the present invention there is provided separation apparatus, useful especially for ultrafiltration, such apparatus comprising two rigid end plates, at least one inlet orifice in one end plate with at least one outlet orifice in the other end plate, such orifices being placed adjacent an end of the associated end plate, a plurality of plane membrane support elements stacked between the end plates in overlying relationship, semi-permeable membranes carried by the membrane support elements and defining, with said support elements, chambers, first and second apertures in the membrane support elements, the first aperture being adjacent one end of the support elements and aligned with one another to form a first duct through the stack, in communication with the inlet orifice of said one end, the second aperture being adjacent the other end of the support elements and forming a second duct through the stack, means connecting said ducts to each chamber, at least one intermediate plate in the stack dividing the stack into at least two sub-assemblies, the intermediate plate being provided with an opening aligned with the second duct only.

In effect with such an apparatus the flow in the various chambers of a sub-assembly is in parallel, so that without any reduction in the area available for filtration, it is possible to carry out the filtration at high flow rates with only low pressure drops.

With the apparatus of the present invention it is possible to detect the rupture of a membrane easily and the element supporting the membrane can be readily removed and replaced.

The apparatus according to the invention has also the advantage of being able to be easily cleaned and can be constructed from any material, especially from plastic materials of medical or foodstuff quality, and of being of a relatively low cost price.

The present invention will be better understood from the following description, which is given only by way of example, reference being made to the accompanying drawings, in which:

FIG. 2 is a front elevation of a distribution plate of the apparatus;

FIG. 3 is a cross-section along the line AA of FIG. 2;

FIG. 4 is a front elevation of a membrane support plate of the apparatus;

FIG. 5 is a cross-section along the line CC of FIG. 4;

FIG. 15 is a view similar to FIG. 7 of a modified construction;

FIG. 16 is a cross-section taken along the line LL of FIG. 15;

Figure 1:
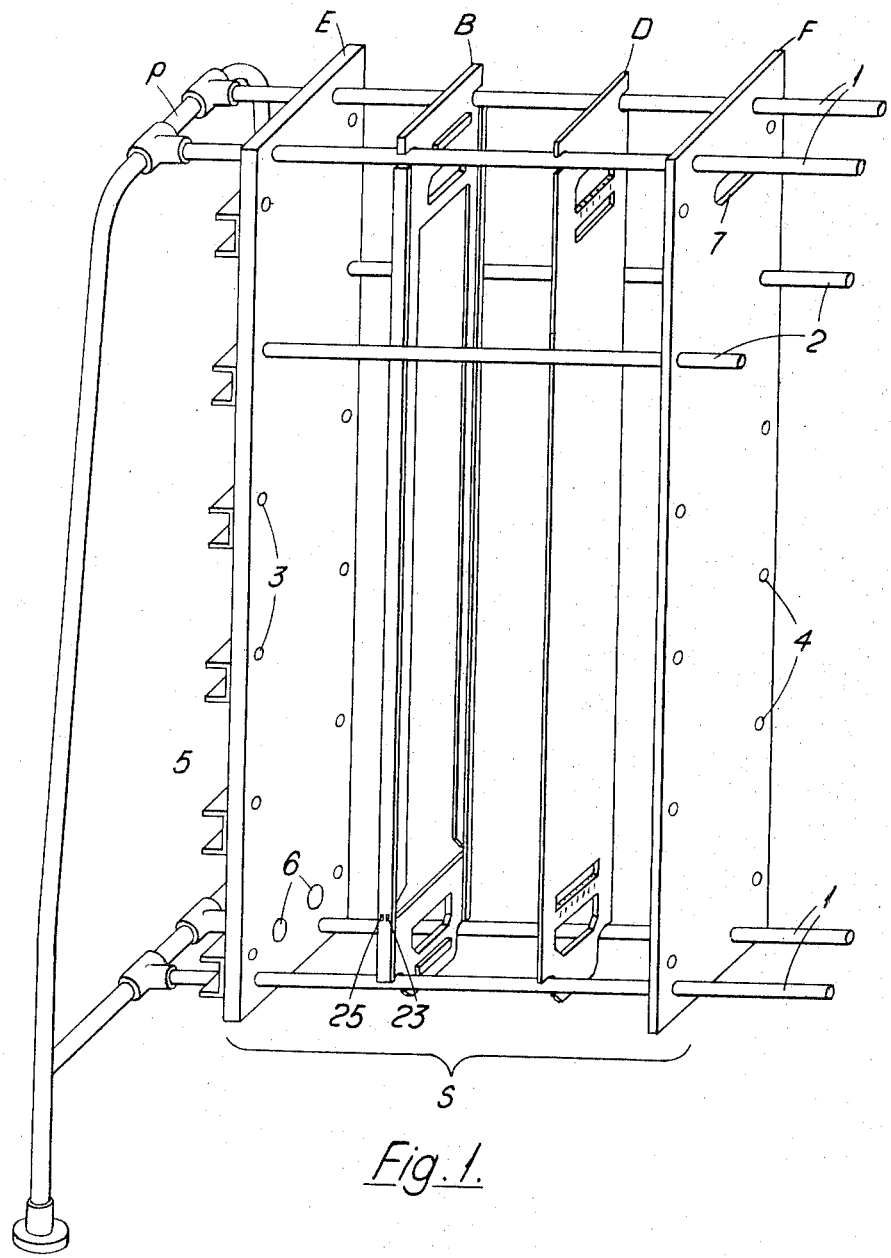
FIG. 1 is a partial exploded perspective view of one embodiment of apparatus according to the invention.

The principal elements constituting the apparatus according to the present invention are shown in FIG. 1. The apparatus consists of a supporting frame P equipped with guiding rods 1, two end plates E, the desired number of membrane support plates B, one or more intermediate plates F and, optionally as shown, a distribution plate D between each membrane support plate B.

In use, the plates are held tightly together by means of tie rods 2. A certain number of membrane support plates alternating optionally with distirbution plates can be joined together in sub-assemblies, these sub-assemblies being bounded by an end plate E and by an intermediate plate F, or by two intermediate plates.

Thus the apparatus according to the present invention contains at least one sub-assembly formed, either by alternately stacking support plates B and distribution plates D, or by stacking only membrane support plates B. Joints J or J1, according to the type of stack chosen and will be referred to later, separate the plates.

FIG. 1 shows in perspective a part of an apparatus containing more especially a distribution plate D and a membrane support plate B of a sub-assembly S which in fact contains several of these plates juxtaposed in a leakproof manner and arranged vertically. These plates D and B are positioned between an end plate E and an intermediate plate F, provided with an elongate opening 7 arranged as indicated later. Preferably, all these plates are rectangular. The end plate E is attached to a guide device consisting of rods 1 which engage in slots in plates B and D, to hold these plates. Plate E is formed with at least one orifice 6, either for the introduction, or for the removal of the fluid to be treated. Tie rods 2 pass through holes 3 in the end plates E and through holes 4 in the intermediate plates F. These tie rods 2 serve to clamp the stack of plates, the clamping force being distributed over the end plates E by means of channel section members 5.

A complete apparatus consists of two similar end plates E, one or more intermediate plates F and two or more sub-assemblies, the latter being linked among themselves in series, without an external pipeline.

Figure 14:
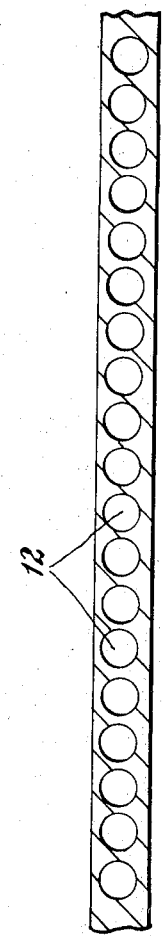
FIG. 14 is a cross-sectional view taken along the line KK of FIG. 2.

FIG. 2 and FIG. 3 show the details of construction of a distribution plate D. Near its opposite extremities, this plate has upper 8 and lower 9 guide and positioning slots, and two apertures 10 arranged in an essentially symmetrical manner relative to the transverse axis of the plate. Each of these apertures 10 includes a distribution bar 11 such as that shown in the FIGS. Each bar contains a large number of equidistant, longitudinal ducts 12 shown in cross-section in FIG. 14.

Figure 6:
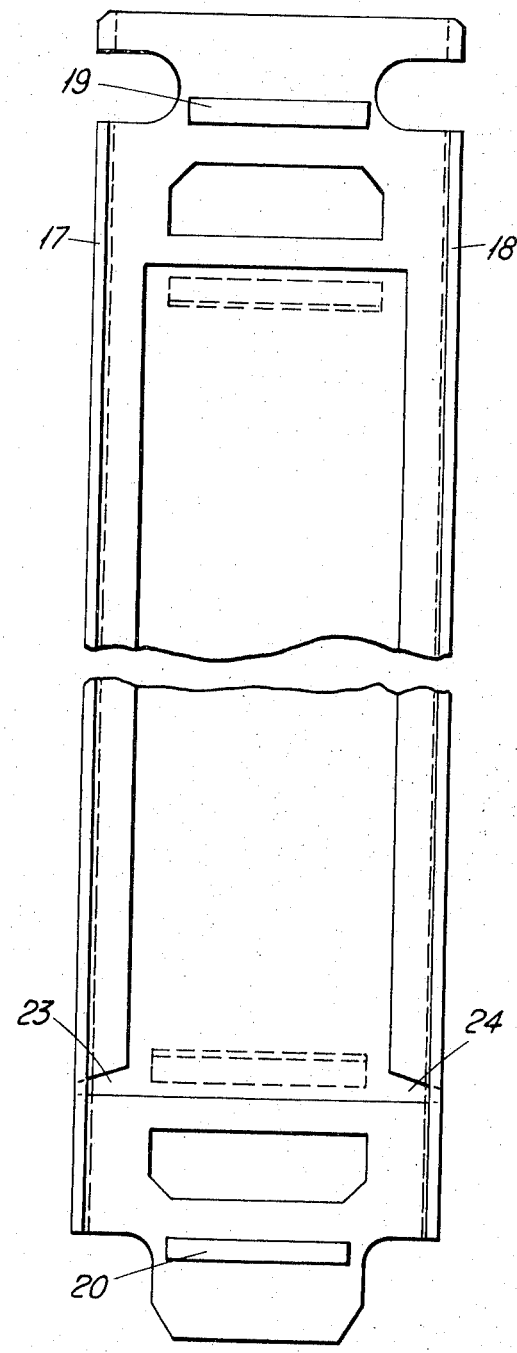
FIG. 6 is a front elevation of the assembly of the plates of FIGS. 2 to 5.

FIG. 4 and FIG. 5 show the details of construction of a membrane support plate B. This plate has upper 13 and lower 14 slots, the shape and positioning of which are similar to those of the distribution plate D. These two plates B and D are essentially of the same length, it being advantageous to have the membrane support plate wider, as can be seen from FIG. 6, which shows the relative positioning of the two plates, the distribution plate D being represented by broken lines.

The membrane support plate B is formed with two elongate apertures 15 and 16 corresponding to and aligned with the apertures 10 in the plates D for the introduction of the liquid to be treated and the removal of this liquid. It is provided, on each face, with lateral rims 17 and 18 and transverse rims 19 and 20 defining a frame, for the positioning and the holding of the jointing member (described later) during the tightening of the apparatus and while it is subjected to pressure. Support plate B is formed with a recess 21 and 22 on each of its opposite faces divided by a partition. Each of these receives a packing which will be described later and on which a membrane rests. Ducts, 23 and 24 on the one face, and 25 and 26 on the opposite face (duct 26 is not shown in the Figure), for the removal of the fluid which has crossed the membrane, correspond to each of these recesses 21 and 22, and these ducts discharge out of the chambers formed between the partitions of plate B and the adjacent plates D.

Figures 8, 9:
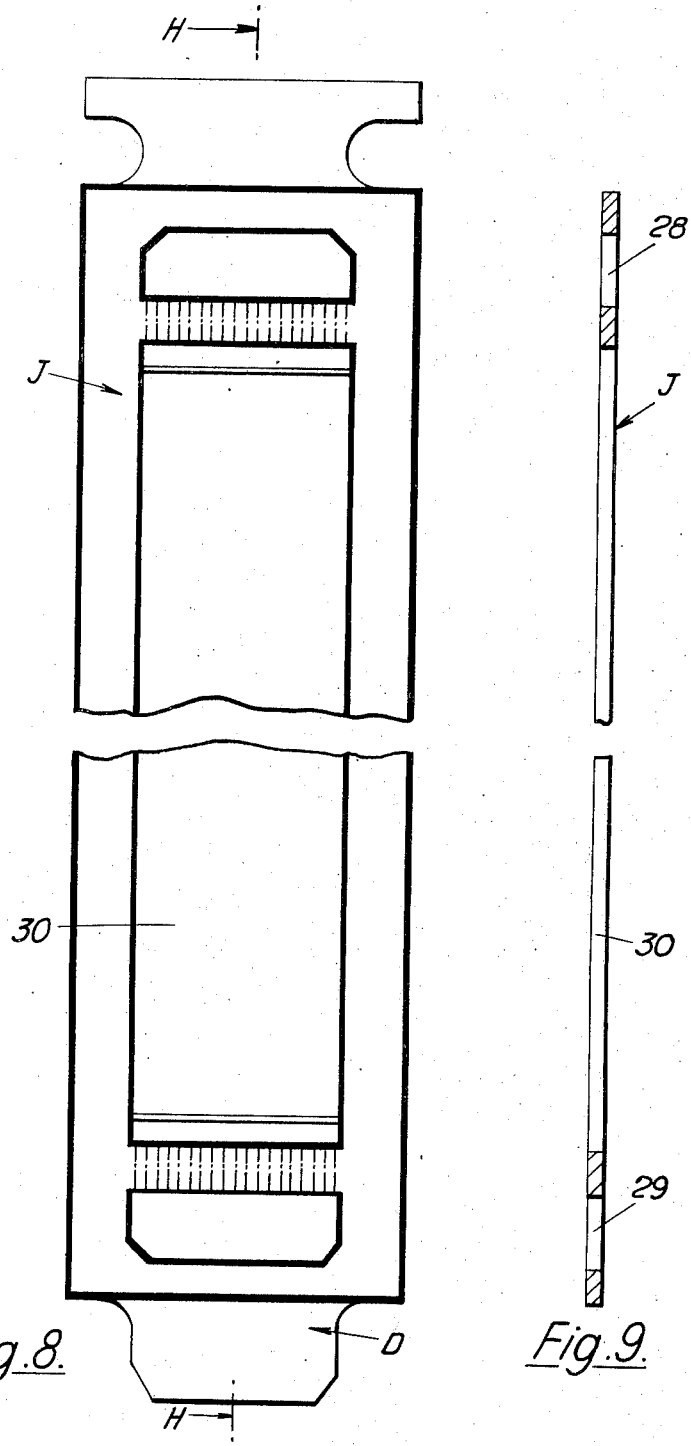
FIG. 8 shows the same jointing member positioned relative to the distribution plate.
FIG. 9 is a cross-section of the jointing member along HH of FIG. 8.

Between each distribution plate D and membrane support plate B there is a jointing member J, shown in FIG. 8 in heavy lines, positioned relative to a distribution plate D, shown in fine lines. The jointing member J has two elongated apertures 28 and 29 corresponding to the openings 10, 15 and 16 of the plates D and B for the passage of the fluid, and a central opening 30 corresponding to the recesses 21 and 22.

Figure 7:
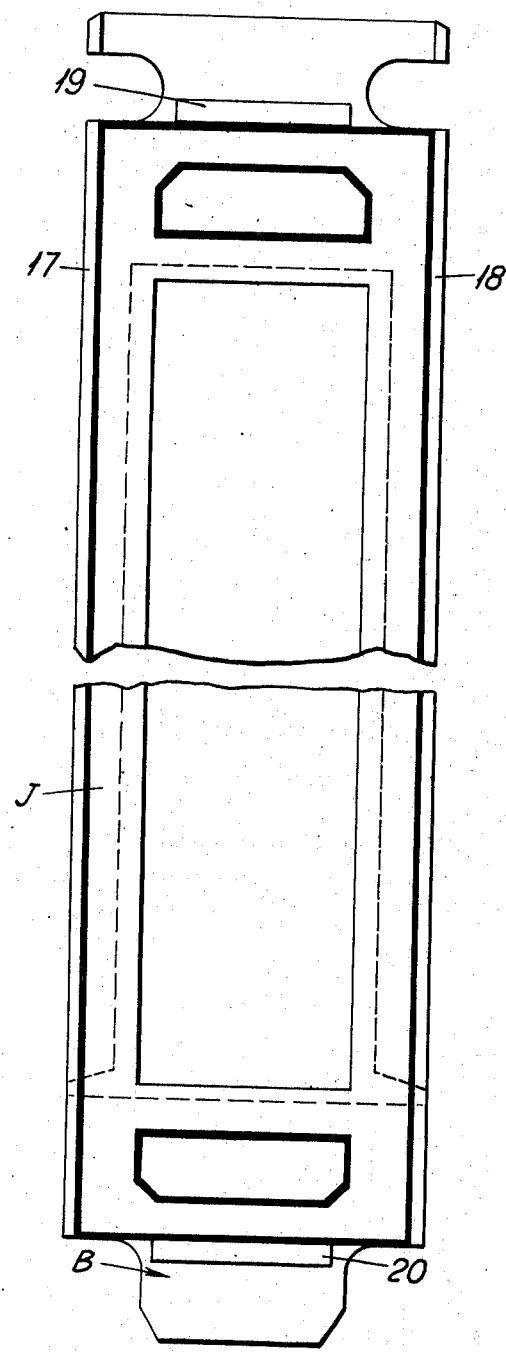
FIG. 7 is a view similar to FIG. 6 also showing a jointing member assembled on the support plate.

FIG. 7 shows the jointing member J placed on a membrane support plate B shown in fine lines. It can be seen that the jointing member is supported externally by reinforcing lateral and transverse rims 17, 18, 19 and 20.

Figure 13:
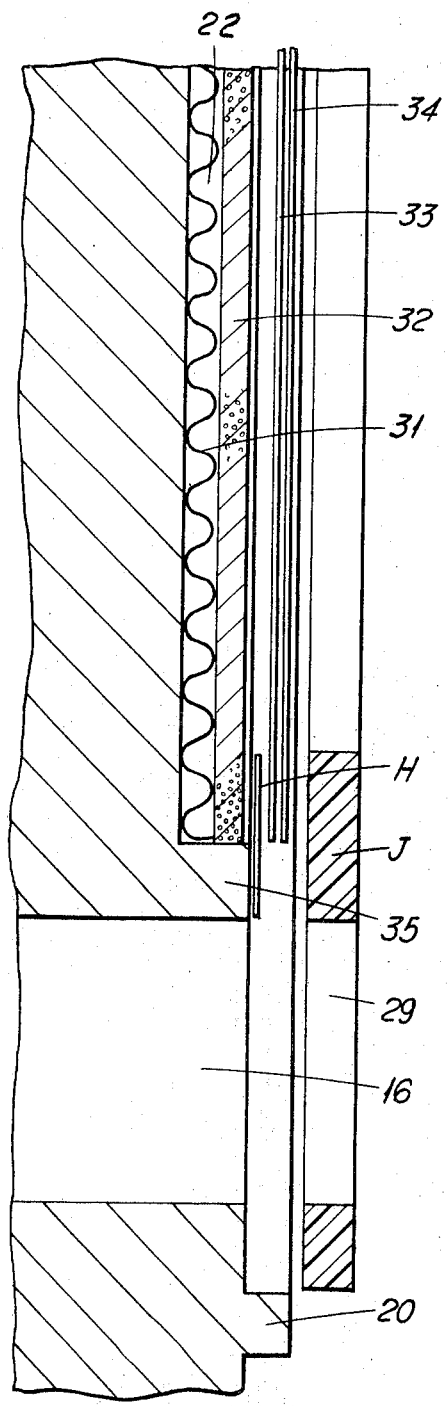
FIG. 13 shows a detail of the packing arranged on a membrane support plate.

Each membrane support plate B shown in FIG. 4 contains, inside the recesses 21 and 22, a packing, the details of which are shown in FIG. 13 in partial cross-section, corresponding to the end of FIG. 5. Inside the recess 22 going from the partition outwards, there is:
a lattice 31,
a porous plate 32,
a filter paper 33 and
a membrane 34.
The thickness of this packing correspond substantially to the depth of the recess. The jointing member J rests on the membrane and is positioned as shown in FIG. 13.

The lattice can be made, for example, of a grid obtained from two layers of crossed and heat-sealed polyethylene fibres. The porous plate can, for example, be of sintered polyethylene or polyethylene perforated with many channels.

In order to be able easily to replace a support plate B of which a membrane has failed, it is of advantage to mount and arrange the different elements of the packing in the following manner, the plate at this time being horizontal.

The grid 31 and then the porous support 32, the dimensions of which correspond to those of the recess, are placed at the bottom of the recess 22, and the thickness of these two elements is essentially equal to the depth of the recess 22. These two elements are then held in position by means of an adhesive tape H (shown in FIG. 13) the action of which is exerted partially on the porous support and partially on the plate itself, this tape going right round the recess under consideration. The action of the adhesive tape H is exerted on the plate over a width which corresponds essentially to the width marked at 35, between the apertures 15 or 16 and the edge of the recess 22. By means of this tape the grid 31 and the porous support 32 are firmly connected to the plate B.

A thin filter paper 33, the dimensions of which correspond to those of the recess, is then arranged on the porous support, and then it is covered with a membrane 34, the dimensions of which are slightly greater than those of the recess.

The jointing member J, the position of which relative to the support plate B is shown in FIG. 7, is then laid on the membrane and on the support plate, between reinforcing lateral and transverse edges 17, 18, 19 and 20, the jointing member J having previously been coated with glue, preferably a glue which does not harden, on its face which will be in contact with the membrane.

Thus on a membrane support plate, the packing, the membrane and the jointing member are firmly connected and can easily be manipulated together.

Thanks to this assembly, in a case of membrane rupture, the jointing member J, the membrane 34 and the filter paper 35 can be removed, without removing either the grid 31 or the porous support 32.

Figure 10:
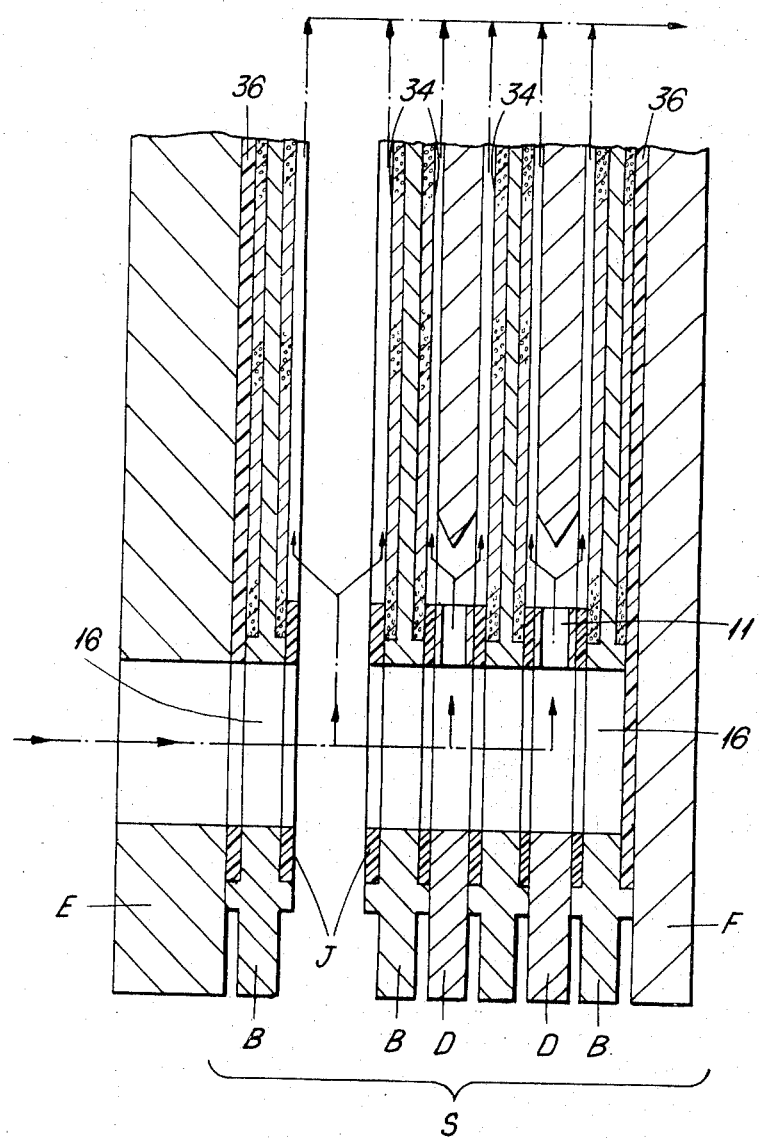
FIG. 10 is a partial view in cross-section of the sub-assembly of the apparatus of the invention.

FIG. 10 is a cross-section of a sub-assembly S, in which the arrows show the direction of circulation of the liquid to be treated inside the apparatus. As will be seen, the flow of fluid in the various chambers of a sub-assembly is in parallel, a chamber being defined, in this case by a jointing member J, a membrane 34 and a face of the distribution plate D adjacent the support plate B carrying the membrane in question.

The membrane support plate B and the distribution plate D are arranged between an end plate E and an intermediate plate F. The jointing members J are arranged on the plates B. The fluid to be treated crosses the elongated apertures 16 of the plates B, and then the distribution bars 11, and thus is distributed on both sides of the bevelled edge of the distribution plate D, and comes in contact with the membranes 34. For simplification, the plates B adjacent to the end plate E and to the intermediate plate F are similar to those between the distribution plates D. The jointing members 36 adjacent to the end plates E or to the intermediate plates F have the same external dimensions as the jointing members J, but have only one elongated aperture and do not have any central opening 30.

In order to simplify the drawing, the distribution plate D has been omitted between the two support plates B shown on the left of FIG. 10. Needless to say, the number of plates shown in FIG. 10 is not imperative.

Figure 11:
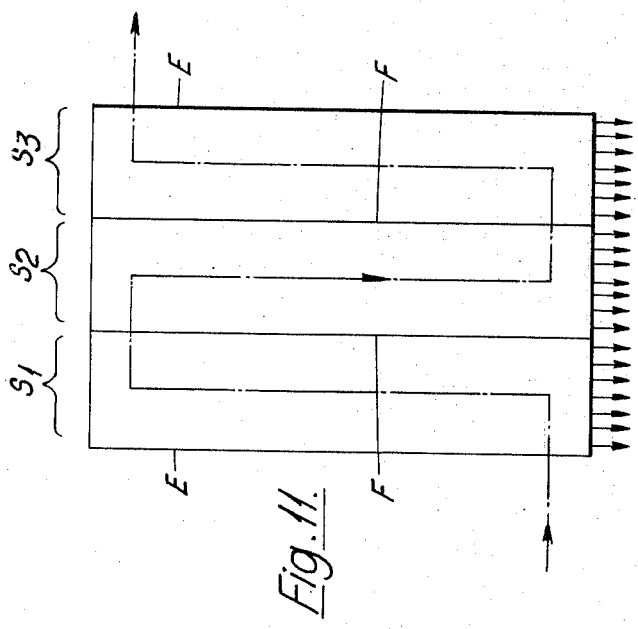
FIG. 11 is a flow diagram of the fluids in one form of apparatus according to the invention.

FIG. 11 is the schematic view of an apparatus containing three sub-assemblies, $S_1$, $S_2$, and $S_3$, internally linked in series, and which thus consist of 2 end plates E and 2 intermediate plates F. The intermediate plates F are identical to that shown in FIG. 1, the opening 7 of these plates being in the axis of the apertures 15 or 16 of the membrane support plates B. The broken line carrying an arrow shows the direction and the general flow path of the liquid to be treated from one sub-assembly to another, whilst the arrows at the foot of each sub-assembly show the removal of the fluid which has crossed the membrane.

Figure 12:
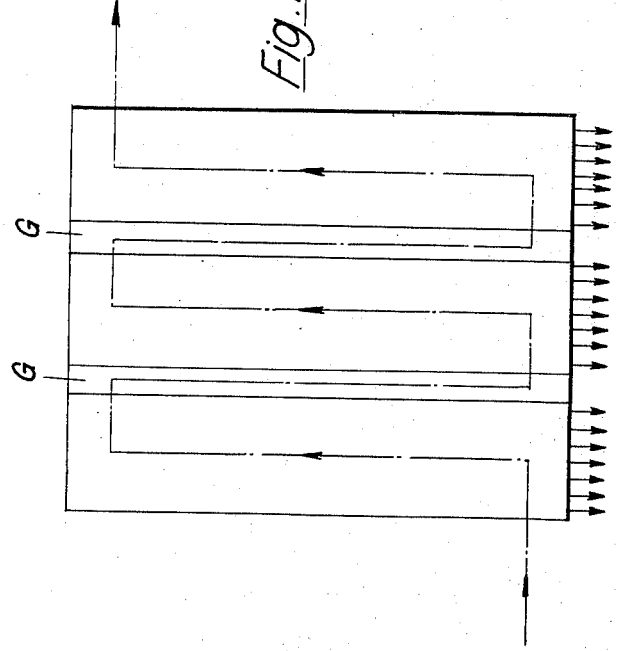
FIG. 12 is a modified flow diagram.

FIG. 12 is the schematic view of a similar apparatus also containing 3 sub-assemblies internally linked in series, but in which the intermediate plates G are modified and contain an internal channel which allows the fluid to be treated to have an ascending path within each sub-assembly.

The thickness of the layer of fluid in contact with the membrane is advantageously controlled by choosing a joint J of definite thickness, and this determines the desired separation between the distribution plate D and the membrane.

Figure 17:
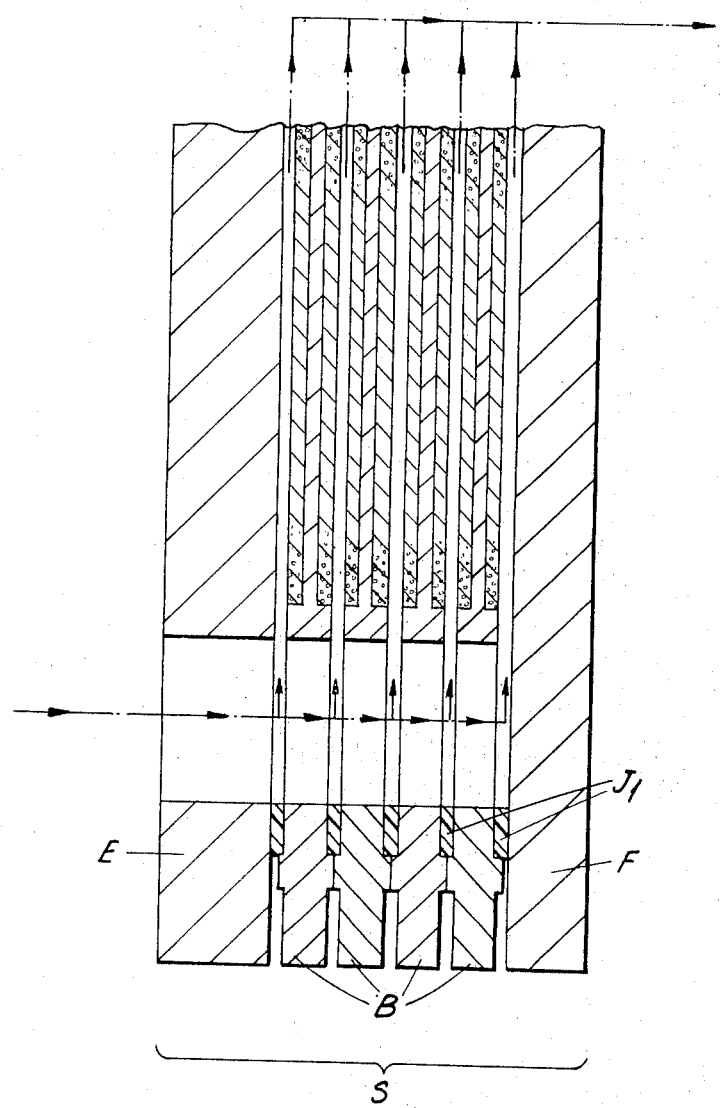
FIG. 17 is a view similar to FIG. 10 of this modified construction.

As has already been said at the beginning of the description, an apparatus according to the present invention can contain only membrane support plates B separated from one another by jointing members J1, these support plates, placed side by side, being able to form sub-assemblies separated from one another by intermediate plates F. In this embodiment of the apparatus (see FIG. 17), the jointing members J1 used are different from the jointing members J used previously with distribution plates D because these members J1 do not have separate elongate apertures at their extremities but rather have a large aperture extending along their length; this can be better understood by referring to FIG. 15 which shows the positioning of such a joint (in heavy lines) on a support plate (in fine lines) and by referring to FIG. 16. The thickness of this member J1 determines the thickness of the liquid layer between the membranes of two consecutive support plates B. Needless to say the number of plates shown is given purely by way of illustration, and must be adapted to each application. In this apparatus the chamber is defined by a jointing member $J_1$ and the membranes of two consecutive support plates B.

The packing of each recess of the support plates B, as well as the assembling of the membranes, is carried out in a manner similar to that described above. However, the membrane is attached, for example, by sticking it on the adhesive tape in the transverse zones 35 of the plate (see FIG. 15). In fact, these zones are no longer pressed against the support plates by the jointing members J1.

Figure 18:
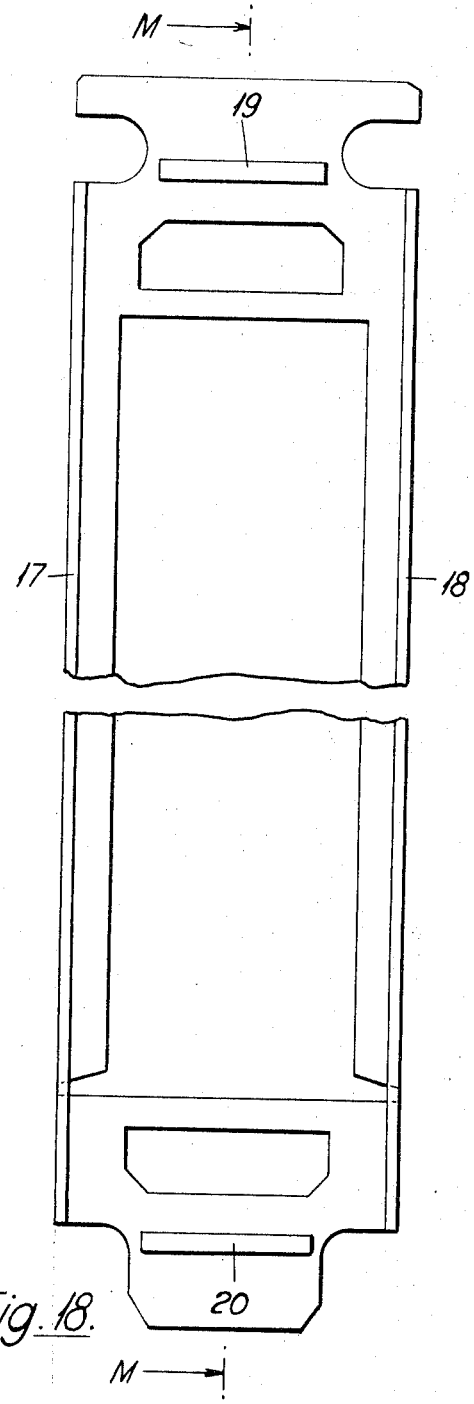
FIG. 18 is a front elevation of a further embodiment of a membrane support plate.
Figure 19:
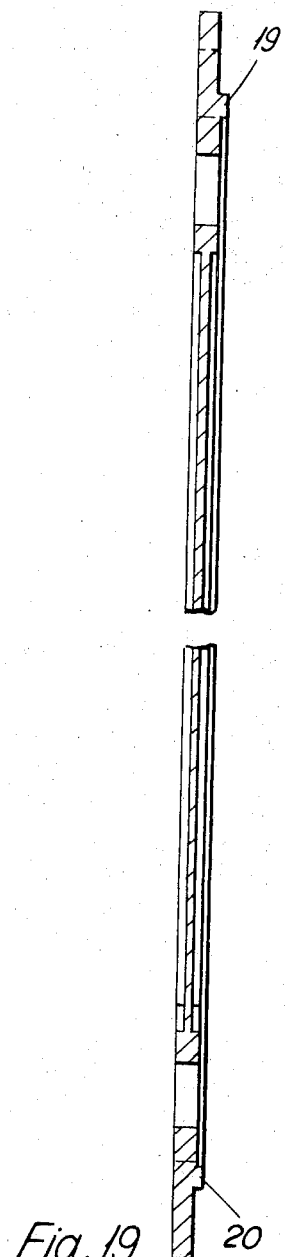
FIG. 19 is a cross-section taken along the line MM of the plate shown in FIG. 18.
Figure 20:
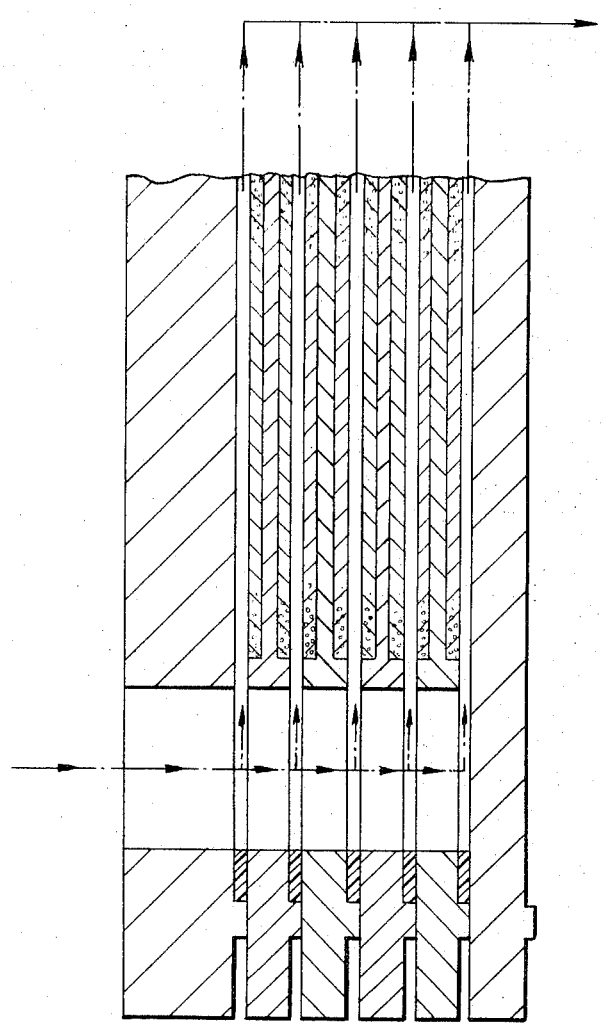
FIG. 20 is a partial cross-sectional view of a sub-assembly using the membrane support plates shown in FIG. 18.

By way of a different embodiment, the membrane support plates can be of the type shown in FIGS. 18 and 19. In such plates, the longitudinal 17 and 18 and transverse 19 and 20 edges, marked in FIG. 15, are now only on one single face of each plate. The mounting of a sub-assembly with such plates is shown, by way of example, in FIG. 20.

An apparatus containing only membrane support plates is of a reduced overall size and of simple construction, and has proved useful for the treatment of viscous or loaded materials.

Numerous other embodiments will be apparent to the man skilled in the art, especially insofar as the elements of the packing are concerned. The porous plate 32 can be replaced by paper or by felt, and preferably by a non-woven filtering element, made of, for example, polyethylene glycol terephthalate. It is also possible to have, at the base of the cells, a section which allows the grid to be dispensed with.

The filter paper 33 can also be removed in certain cases if the surface of the support 32 is sufficiently smooth, and there is no risk of tearing the membrane 34. The design of the plates of type B in contact with the plates E or F can be simplified, since they present only one active face.

An advantage of the apparatus according to the invention is that it is rapidly adaptable for every application for which it is desired to be used, and especially that it allows a high speed of the treated fluid over the entire surface of the membranes with a very low pressure drop, owing to the possibility of mounting the sub-assemblies linked in series, each sub-assembly being able to contain as many plates as desired, and owing to the choice of the thickness of the layer of fluid treated.

Another advantage of this apparatus is the possibility of easily detecting the rupture of a membrane because of the fact that there are individual exits for the filtrate. It is thus easy to change the corresponding membrane support plate, by simply sliding the other elements along the guide bars.

Another advantage of this apparatus is that it allows the circuit of the liquid to be treated to be cleaned easily, for example after a long period of use, all the plates being easily accessible by simply unclamping the apparatus.

The apparatus according to the invention can be constructed from a number of different materials, depending on the particular use to which it will be put, and the pressures which must be attained. It lends itself well to construction from plastics, for example, polyvinyl chloride. It can be constructed from plastics of medical or foodstuff quality and this makes its use particularly valuable, especially for the treatment of biological or foodstuff liquids. It can also be used in ultrafiltration and hyperfiltration, and in the chemical industry, the dyestuff industry, the paper industry and the like. It can also be used in inverse osmosis and in gas permeation.

We claim:
1. Separation apparatus, useful especially for ultrafiltration, said apparatus comprising, in combination:
   a. two rectangular rigid end plates;
   b. ends of said end plates;
   c. means defining at least one inlet orifice in one end plate for the introduction of the fluid to be treated and at least one outlet orifice in the other end plate for the removal of the fluid to be treated, said orifices being placed adjacent one end of the associated end plate;
   d. a plurality of membrane support plates of generally rectangular shape, in overlying relationship with respect to one another, each said support plate carrying a generally rectangular semi-permeable membrane without apertures therein on each of its faces and having duct means for the removal of the fluid which has crossed through the said membranes;

e. first and second generally elongate apertures for the passage of the fluid to be treated through the support plates, the first apertures being adjacent one end of the support plates and aligned with one another to form a first duct through the stack, in communication with the inlet orifice of the said one end plate, the second apertures being adjacent the other end of the support plates and forming a second duct through the stack;

f. holding means extending between the two end plates effective to hold the support plates in position;

g. jointing members separating said support plates in a leakproof manner and enabling the fluid to be treated to pass in contact with the membranes of two consecutive plates and flow substantially parallel to the longitudinal axis of the said plates;

h. at least one intermediate plate in the stack dividing the said stack into at least two sub-assemblies; and i. one generally elongate opening through said intermediate plate aligned with said second duct only.

2. Separation apparatus as claimed in claim 1, and further comprising on each face of each support plate a recess in which a membrane lies, said recess extending between the opposite elongate apertures and being connected to at least one of said duct means.

3. Separation apparatus as claimed in claim 2, in which each support plate comprises at least one laterally extending duct connecting the recess to an adjacent edge of the support plate.

4. Separation apparatus as claimed in claim 1, and further comprising, on at least one face of each support plate, lateral and transverse rims for the positioning and holding of a jointing member.

5. Separation apparatus as claimed in claim 1, and further comprising means defining a central opening in each jointing member, the width of said opening being substantially equal to the lateral extent of elongate aperture and the length of which is substantially equal to the longest distance between the two elongate apertures.

6. Separation apparatus as claimed in claim 2, in which the width of each recess is at least equal to the lateral extent of the elongate apertures.

7. Separation apparatus as claimed in claim 2, and further comprising a permeable support in each recess on which support the associated membrane rests.

8. Separation apparatus as claimed in claim 2, in which on each face of the support plate a membrane is attached in a leakproof manner to the transverse zone of the said plate between the recess and the adjacent elongate aperture.

9. Separation apparatus as claimed in claim 1, in which the means for holding the support plate comprises a member extending between the two end plates and slots provided in the support plates in which said member engages.

10. Separation apparatus as claimed in claim 1, and further comprising a distribution plate situated between two consecutive membrane support plates, said distribution plates being of generally rectangular configuration and comprising first and second generally elongate apertures in communication with the first and second apertures of the support plate, means defining openings inwardly of first and second apertures of said distribution plates, a distribution bar having longitudinal channels formed therein separating each opening from its associated first and second aperture, bevelled edges to said distribution plates defining the inner edges of said openings and jointing members separating said support plates and said distributing plates, in a leakproof manner, whereby the fluid to be treated passes between the support plate and the distribution plate with the fluid flowing substantially parallel to the longitudinal axis of said plates.

* * * * *